United States Patent
Graichen et al.

(10) Patent No.: US 11,577,393 B2
(45) Date of Patent: Feb. 14, 2023

(54) METHOD FOR COLLISION-FREE MOTION PLANNING

(71) Applicant: PILZ GMBH & CO. KG, Ostfildern (DE)

(72) Inventors: Knut Graichen, Ulm (DE); Andreas Völz, Ulm (DE); Daniel Bakovic, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 979 days.

(21) Appl. No.: 16/381,428

(22) Filed: Apr. 11, 2019

(65) Prior Publication Data

US 2019/0232496 A1    Aug. 1, 2019

Related U.S. Application Data

(63) Continuation of application No. PCT/EP2017/077620, filed on Oct. 27, 2017.

(30) Foreign Application Priority Data

Oct. 31, 2016   (DE) ...................... 10 2016 120 763.2

(51) Int. Cl.
   *B25J 9/16*   (2006.01)
(52) U.S. Cl.
   CPC .......... *B25J 9/1666* (2013.01); *B25J 9/1682* (2013.01); *G05B 2219/39001* (2013.01); *G05B 2219/39135* (2013.01); *G05B 2219/40438* (2013.01)
(58) Field of Classification Search
   CPC ................. B25J 9/1666; B25J 9/1682; G05B 2219/39001; G05B 2219/39135; G05B 2219/40438
   See application file for complete search history.

(56) References Cited

U.S. PATENT DOCUMENTS

| 8,914,152 B2 | 12/2014 | Scheurer et al. |
| 2014/0025203 A1 | 1/2014 | Inazumi |

(Continued)

FOREIGN PATENT DOCUMENTS

| DE | 102006007623 A1 | 8/2007 |
| DE | 102010007458 A1 | 8/2011 |

(Continued)

OTHER PUBLICATIONS

English translation of International Preliminary Report on Patentability (Chapter 1) for application No. PCT/EP2017/077620; dated Apr. 30, 2019; 6 pp.

(Continued)

*Primary Examiner* — Basil T. Jos
(74) *Attorney, Agent, or Firm* — Miller Johnson

(57) ABSTRACT

A method and corresponding apparatus for collision-free motion planning of a first manipulator in a first working space and a second manipulator in a second working space, wherein the first and second working spaces at least partially overlap. The method includes the steps of importing a first dynamic roadmap for a first configuration space of the first manipulator, wherein the first dynamic roadmap includes a first search graph and a first mapping between the first working space and the first search graph, and importing a second dynamic roadmap for a second configuration space of the second manipulator, wherein the second dynamic roadmap includes a second search graph and a second mapping between the second working space and the second search graph. Furthermore, the motion of the first manipulator and the second manipulator are coordinated based on the first dynamic roadmap and the second dynamic roadmap.

18 Claims, 4 Drawing Sheets

(56) References Cited

U.S. PATENT DOCUMENTS

2015/0266182 A1     9/2015    Strandberg
2017/0210008 A1*   7/2017    Maeda .................. B25J 9/1666

FOREIGN PATENT DOCUMENTS

| JP | S61260306 A | 11/1986 |
| JP | 2003200368 A | 7/2003 |
| JP | 2004280635 A | 10/2004 |
| JP | 2014073550 A | 4/2014 |

OTHER PUBLICATIONS

Hong Liu et al.; A Dynamic Subgoal Path Planner for Unpredictable Environments; 2010 IEEE International Conference on Robotics and Automation; May 3-8, 2010; pp. 994-1001.

Hong Liu et al.; A Planning Method for Safe Interaction between Human Arms and Robot Manipulators; 2005 IEEE/RSJ International Conference on Intelligent Robots and Systems; Aug. 2-6, 2005; 7 pp.

Marcelo Kallmann et al.; Motion Planning Using Dynamic Roadmaps; International Conference on Robotics & Automation; Apr. 2004; pp. 4399-4404.

Mokhtar Gharbi et al.; Roadmap Composition for Multi-Arm Systems Path Planning; 2009 IEEE/RSJ International Conference on Intelligent Robots and Systems; Oct. 11-15, 2009; pp. 2471-2476.

International Search Report for PCT/EP2017/077620; dated Feb. 2, 2018; 2 pp.

Japanese Office Action for JP 2019520740; dated Jun. 10, 2021; 5 pages.

* cited by examiner

METHOD FOR COLLISION-FREE MOTION PLANNING

CROSS-REFERENCE TO RELATED APPLICATIONS

This application is a continuation of international patent application PCT/EP2017/077620, filed on Oct. 27, 2017 designating the U.S., which international patent application has been published in German language and claims priority from German patent application DE 10 2016 120 763.2, filed on Oct. 31, 2016. The entire contents of these priority applications are incorporated herein by reference.

BACKGROUND OF THE INVENTION

The present invention relates to a method for collision-free motion planning of a first manipulator in a first working space and a second manipulator in a second working space as well as a corresponding apparatus.

In robotics, collision-free motion planning is the task of finding a motion path for a robot or its manipulator from a starting point to an end point without a collision with an obstacle or with itself occurring during motion. A method for collision-free motion planning is, for example, known from DE 10 2010 007 458 A1.

DE 10 2010 007 458 A1 discloses collision-free motion planning for an industrial robot with a single robot arm (manipulator), such as is used in modern production systems. Industrial robots are working machines for the handling, assembling or processing of workpieces. An industrial robot usually comprises at least one manipulator with several motion axes and a programmable controller that coordinates the robot's motion sequences during operation by controlling the robot's drives accordingly.

In addition to these common single-arm robots, robots with two or more arms are increasingly coming into the focus of research. Due to their similarity to humans, two-arm robots are a preferred design not only for humanoid robots, but also for robots in the field of telerobotics, in which robots are remotely controlled by a human operator. In addition, many workplaces in industry are originally designed for people and are therefore designed for two-hand operation.

The goal of motion planning for a multi-arm robot is basically the same as for a single-arm robot, namely to find a motion path for each arm from a starting point to an end point without colliding with an obstacle including itself or the other arm in the working space. In principle, it is therefore possible to use the known methods for motion planning for single-arm robots also for multi-arm robots, whereby the other arm is regarded as another dynamic obstacle in the working space. Planning then takes place in a common configuration space using familiar methods for motion planning. Well-known methods include probabilistic methods such as Probabilistic Roadmaps (PRM) or Rapidly-exploring Random Trees (RRT).

In addition, decoupled approaches are also known in which the motion of each arm is first planned individually and then a kind of coordination takes place. The individual planning is also based on known methods such as the above mentioned probabilistic methods. The decoupled approaches can be advantageous in systems where there is little interaction between the individual arms.

In the known coupled and decoupled approaches for motion planning of multi-arm robots, probabilistic planning methods or methods based on local optimization are predominantly used. Probabilistic methods, however, have the disadvantage that they do not generate deterministic trajectories and the computing time required for such methods may be limited, but is generally not predictable. Methods based on local optimization have the disadvantage that they cannot find solutions in complex environments.

SUMMARY OF THE INVENTION

Against this background, it is an object of the present invention to provide a method for collision-free motion planning for multi-arm robot systems which avoids the disadvantages mentioned above. In particular, it is an object to provide a method that allows a fast deterministic re-planning of collision-free motions in dynamically changing environments.

According to an aspect of the present invention, there is provided a method for collision-free motion planning of a first manipulator in a first working space and a second manipulator in a second working space, the method comprising:

Importing a first dynamic roadmap for a first configuration space of the first manipulator, wherein the first dynamic roadmap includes a first search graph and a first mapping between the first working space and the first search graph;

Importing a second dynamic roadmap for a second configuration space of the second manipulator, wherein the second dynamic roadmap includes a second search graph and a second mapping between the second working space and the second search graph; and Coordinating the motion of the first manipulator and the second manipulator based on the first dynamic roadmap and the second dynamic roadmap.

It is thus an idea to carry out a motion planning on the basis of two independent dynamic roadmaps for the respective manipulators.

Dynamic roadmaps are based on the principle that at first a graph is generated in the configuration space of a robot, assuming an empty environment, i.e. an environment without obstacles. In addition, mappings of parts of the working space to nodes and edges of the graph are calculated in advance in the configuration space and stored, for example, in tabular form. The mappings can be used to quickly find a valid graph for any obstacle.

According to the present disclosure, dynamic roadmaps are now used in a decoupled approach for motion planning. The advantage of this approach is that once a dynamic roadmap has been created, it can be reused for a single robot arm without having to generate a dynamic roadmap for a common working space of a multi-arm robot. The method thus makes it possible to build upon existing data.

The use of dynamic roadmaps also has the advantage that deterministic re-planning is possible. Deterministic planners have the advantage that they can reproduce the behavior of the robot and make it transparent to humans. In addition, the use of dynamic roadmaps has the advantage that planning times of less than 100 milliseconds on a typical desktop PC can be achieved by pre-calculating dynamic roadmaps, since no time-consuming collision check has to be carried out and a collision check can be carried out using the pre-calculated mappings.

Overall, the method thus enables short planning times, thereby enabling rapid re-planning in real time, even on off-the-shelf equipment. In addition, the method can be flexibly extended to multi-arm systems, whereby predefined dynamic roadmaps for individual robot arms can be used.

In a further refinement, coordinating the motion includes checking for collisions between the first and second manipulators by means of the first mapping and the second mapping. The first and second mappings can be available in tabular form and can include an assignment of volume elements in the working space to nodes and edges of the respective search graphs in the configuration spaces. The use of such mappings makes it possible to check a graph in the configuration space for any obstacles in the working space. This refinement thus contributes advantageously to rapid re-planning.

In a further refinement, coordinating the motion includes determining a first motion path for the first manipulator from the first dynamic roadmap and determining a second motion path for the second manipulator from the second dynamic roadmap. In accordance with this refinement, two motion paths are determined first on the basis of the respective dynamic roadmap. This refinement contributes to the fact that the path search can be carried out particularly easily on smaller search graphs.

In a further refinement, the first motion path is determined independently of the second motion path. This refinement allows a complete separation of the determination of the first and the second motion path. This has the advantage that the calculation of the individual motion paths can take place independently of each other and can therefore be easily parallelized. In addition, existing dynamic roadmaps can be reused.

In a further refinement, the first motion path defines an occupied area in the working space and the second motion path is determined outside the occupied area. According to this refinement prioritized planning is carried out. This means that one manipulator is regarded as prioritized and its motion is initially planned independently. Then the planning for the second manipulator takes place, whereby areas in the working space which are occupied by the motion of the first manipulator are marked as occupied during the planning of the further manipulator. The strict separation of the working spaces enables a simple planning procedure.

In a further refinement, the method further comprises generating a coordination graph based on the first dynamic roadmap and the second dynamic roadmap, wherein the motion of the first manipulator and the second manipulator is coordinated by means of the coordination graph. According to this refinement, at first, a coordination graph is created to coordinate the motion of the first manipulator and the second manipulator. The coordination graph enables coordinated planning taking both dynamic roadmaps into account. It has been shown that by using a coordination graph, the proportion of solved coordination problems can be increased.

In a further refinement, generating the coordination graph includes determining a first motion path for the first manipulator based on the first dynamic roadmap, determining a second motion path for the second manipulator based on the second dynamic roadmap, and linking the first and second motion paths to the coordination graph. In this refinement, the coordination graph is generated by linking two separate motion paths. The refinement has the advantage that the planning is less restrictive and therefore more flexible than a strict separation of the working spaces with prioritization of a single arm. In this way, the proportion of solved coordination problems can be advantageously increased.

In a further refinement, for determining the first motion path for the first manipulator, a collision with the second manipulator is ignored, and for determining the second motion path for the second manipulator, a collision with the first manipulator is ignored. This refinement has the advantage that the individual motion paths can initially be planned independently and thus quickly, and that a check for possible collisions only takes place in the coordination graph. This refinement has the advantage that a particularly good ratio between computing time and the proportion of solved coordination problems can be achieved.

In a further refinement, the first motion path for the first manipulator is a first linear graph and the second motion path for the second manipulator is a second linear graph, and the coordination graph contains the full graph product of the first and the second linear graph. By using the full graph product, a coordination graph is generated that includes all possible paths that are possible from the combination of the two individual motion paths. Consequently, the coordination graph captures both simultaneous and successive motion of the manipulators.

In a further refinement, creating the coordination graph includes determining a first motion path for the first manipulator and linking the first motion path and the second search graph to the coordination graph. In this refinement, the first manipulator is prioritized and its motion path is determined first. The motion path of the first manipulator together with the second search graph results in the coordination graph. Accordingly, the motion of the first manipulator is coordinated along its motion path and the motion of the second manipulator along the second search graph. Thus, when planning the motion of the second manipulator, not the entire working space occupied by the motion of the first manipulator is blocked.

In a further refinement, the first motion path for the first manipulator is a first linear graph and the coordination graph is the Cartesian product of the first linear graph and the second search graph. In this way, an efficient coordination graph for motion planning can be easily determined. The Cartesian product has the advantage that a graph is produced with fewer nodes and edges than with a Tensor product or a full graph product.

In a further refinement, for generating the first motion path, a collision with the second manipulator is ignored. This refinement has the advantage that the first motion path can be determined particularly easily and quickly.

In a further refinement, creating the coordination graph includes linking of the first search graph and the second search graph to the coordination graph. In this refinement, at first, the first and second search graphs are linked together and then a motion path for the first and second manipulator is coordinated on the basis of the linked graph.

In a further refinement, the coordination graph is the Cartesian product of the first search graph and the second search graph. This refinement has the advantage that the coordination graph is not unnecessarily complex, but only contains the nodes and edges that are advantageous for the path search.

In a further refinement, at least one of the first and second dynamic roadmaps is an extended dynamic roadmap including an extended search graph with nodes having additional time information, wherein coordinating the motion of the first manipulator and the second manipulator is based on the extended dynamic roadmap. In this configuration at least one of the dynamic roadmaps contains additional time information. Each node in the search graph thus includes not only a valid configuration, but also a valid time. When connecting the nodes to the search graph, a directed graph is created. This refinement has the advantage that time information can be at least partially taken into account during the path search.

It is understood that the aforementioned features and the features yet to be described can be used not only in the respective specified combination, but also in other combinations or on their own without departing from the context of the present invention.

BRIEF DESCRIPTION OF THE DRAWINGS

Exemplary embodiments of the invention are explained in more detail in the following description and are represented in the drawings, in which.

DETAILED DESCRIPTION OF THE PREFERRED EMBODIMENTS

Figure 1:
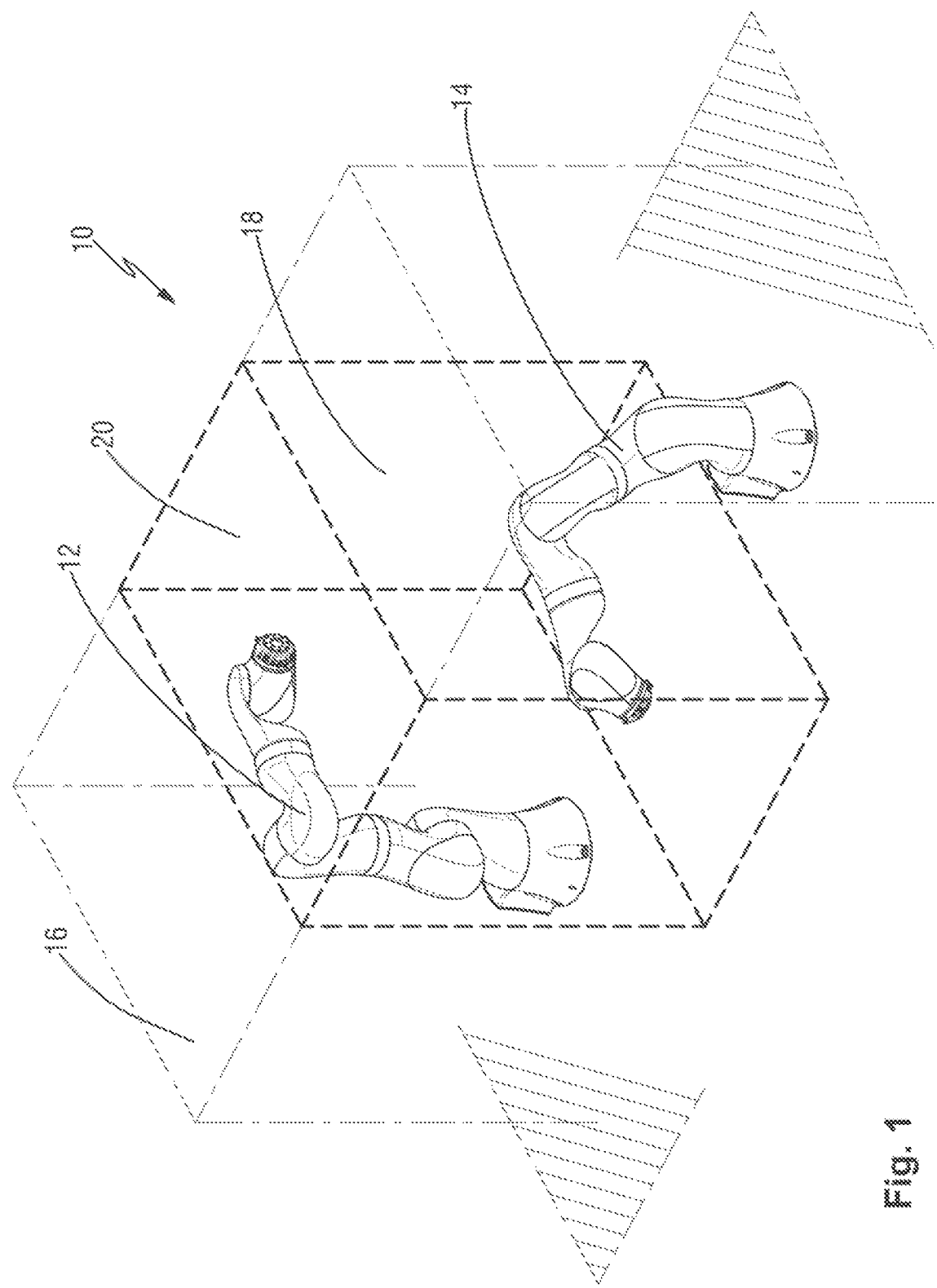
FIG. 1 shows an exemplary embodiment of an apparatus according to the present disclosure.

FIG. 1 shows a first exemplary embodiment of an apparatus according to the present disclosure. The apparatus is designated as a whole by reference numeral 10.

Apparatus 10 according to this embodiment is a robot system with a first manipulator 12 and a second manipulator 14. The first manipulator 12 and the second manipulator 14 are independent robots that are controlled by a common control system (not shown here). The first and the second manipulator 12, 14 each have seven axes of rotation over which they can move in space. The robot system thus comprises 14 degrees of freedom.

Each manipulator is assigned a working space 16, 18 in which it can move. The shape and size of the working space is essentially determined by the number and arrangement of the robot's rotary axes as well as their form of motion. In addition, the working space can also be restricted to a certain form, for example by setting software limits for the control system. The working space is not limited to the cuboid shape shown here, but can also be a cylinder, a sphere or a polyhedron in other embodiments.

The first working space 16 of the first manipulator 12 overlaps the second working space 18 of the second manipulator 14. The common working space 20 is indicated by a dashed line in FIG. 1. Both the first and the second manipulators 12, 14 can be located in the common working space 20 and a collision between the two manipulators 12, 14 may occur. Consequently, the motion of the two manipulators 12, 14 in relation to each other must be coordinated in the common working space 20. For this purpose, the common control system of the two manipulators 12, 14 carries out the method according to the invention, which is explained in detail in relation to the following figures.

It goes without saying that the scenario presented here can only be understood as an example. In other embodiments, the robot system can also have a single robot with two manipulators arranged on it. It is also conceivable that the individual manipulators or robots may have independent control systems as long as joint coordination of the control systems is possible. This can be made possible, for example, via suitable data communication interfaces between the control systems. Likewise, it does not have to be two manipulators of the same type that interact with each other. In other embodiments, the manipulators may be of different design. The working spaces of the two manipulators can also be different in size and shape. Furthermore, the disclosed apparatus and method are not limited to two manipulators. In other embodiments, the robot system may also include other manipulators that interact with the first and/or second manipulator. In addition, it goes without saying that when coordinating the manipulators, it is also possible to take into account effectors such as a tool or a grab as well as any loads arranged on them.

Figure 2:
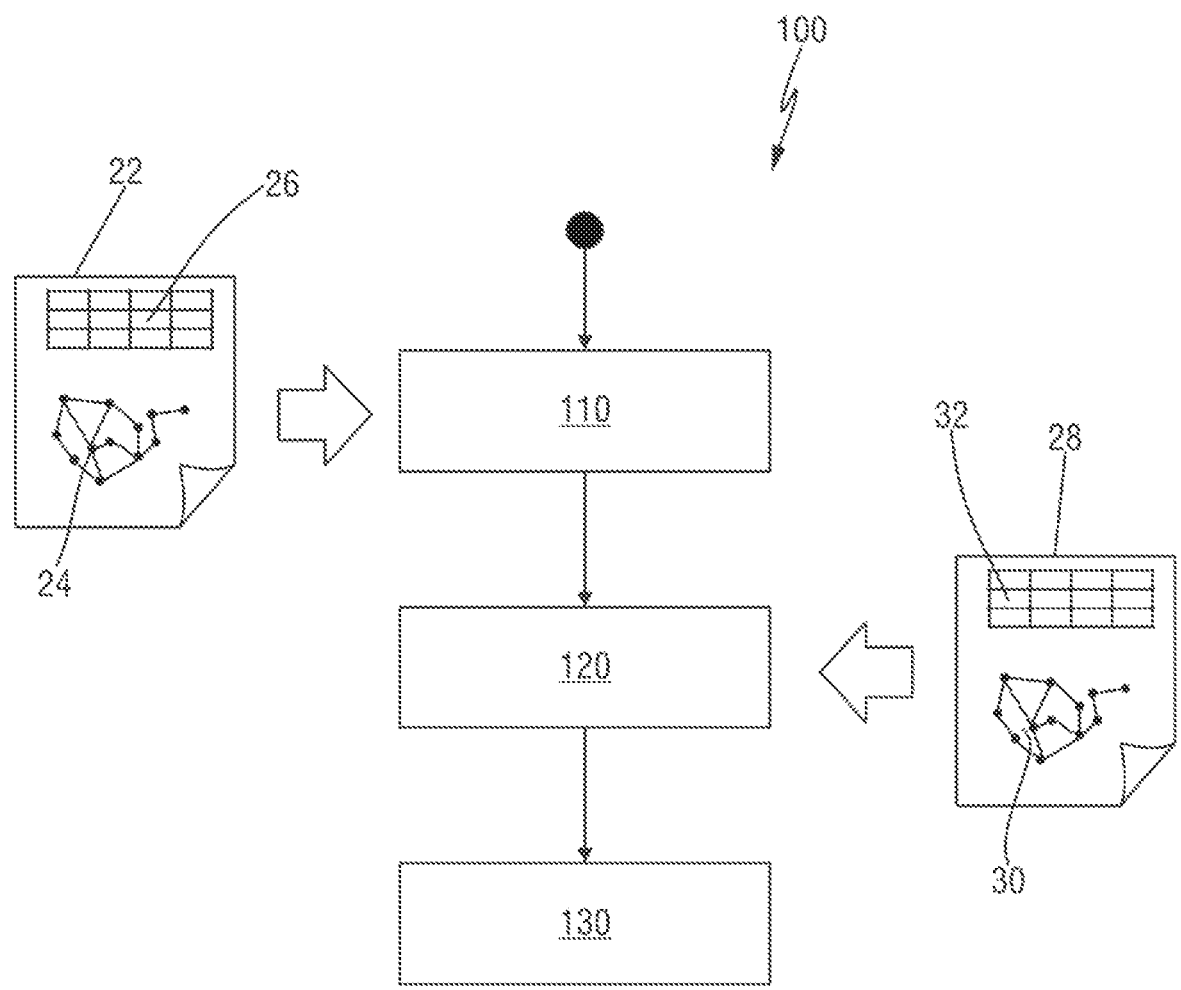
FIG. 2 shows a block diagram of an exemplary embodiment of a method for collision-free motion planning.

FIG. 2 shows in a block diagram an example of a method according to the present disclosure. The method is described here in its entirety with the reference numeral 100 and explained in more detail below in connection with the exemplary embodiment of the apparatus according to FIG. 1.

A first method step 110 comprises importing a first dynamic roadmap 22 for a first configuration space of the first manipulator 12, wherein the first dynamic roadmap includes a first search graph 24 and a first mapping 26 between the first working space 16 and the first search graph 24.

A second method step 120 comprises importing a second dynamic roadmap for a second configuration space of the second manipulator 14, wherein the second dynamic roadmap 28 includes a second search graph 30 and a second mapping 32 between the second working space 18 and the second search graph 30.

The respective configuration space of a manipulator describes the spatial state of the manipulator with a minimum set of independent coordinates. The configuration space thus comprises a set of attainable positions of the manipulator in (three-dimensional) space, whereby the elements of the manipulator are regarded as stiff bodies. In general, the minimum number of coordinates required to describe a system is equal to the number of degrees of freedom.

The configuration space is therefore usually multidimensional and includes all possible states that a manipulator can assume. A state is also referred to as a configuration.

A dynamic roadmap (DRM) includes a graph $G=(V,E)$ in the configuration space and a mapping $\phi$. The graph has nodes V and edges E, where the nodes represent a defined configuration and the edges represent a motion from a first configuration to a second configuration. The graph of a dynamic roadmap is formed from random samples in the configuration space, whereby in the case of a DRM an empty environment, i.e. an environment without obstacles, is assumed. The assumption of an empty environment allows the samples to be taken from an equal distribution and only collisions with themselves have to be considered.

Furthermore, the dynamic roadmap includes a mapping $\phi$ from the working space to the configuration space (or vice versa $\phi^{-1}$). The mapping can be stored in the form of a lookup table. To create the lookup table, the working space is divided into a set of volume elements (so-called voxel) and for each volume element $w \in W$ in the working space a mapping $\phi_v: W \to V$ and $\phi_e: W \to E$ is determined for the nodes and edges of the graph $G=(V,E)$ in the configuration space. If a volume element is occupied by an obstacle, the mappings specify the colliding configurations and motions in the search graph. The tabular representation thus enables a space in the working space to be easily assigned to a number of nodes and edges in the configuration space.

The dynamic roadmap for a manipulator can be generated according to the principle described above independently of the other manipulators of the system. In particular, the dynamic roadmap can be pre-calculated, i.e. the dynamic roadmap for a manipulator or for an independent robot can be calculated and stored in an offline phase. In an online phase, the dynamic roadmap is imported and the search graph is used to determine a motion path. When the motion path is determined, parts of the graph are dynamically invalidated using the mapping. This is done by mapping dynamic obstacles, i.e. obstacles that have not been taken into account in the pre-calculation of the dynamic roadmap, to edges and nodes in the configuration space online via the tabular. The invalidated nodes and edges are then not taken into account for subsequent path planning. By the pre-calculation and the dynamic invalidation of the search graph new plans can be realized within less than 100 milliseconds.

Using the two dynamic roadmaps, the motion of the first manipulator and the second manipulator are coordinated in process step 130. Four different approaches are explained below.

A first approach, hereinafter referred to as fixed separation, can be classified as prioritized planning. The approach pursues the idea of strictly separating the working space of the two manipulators so that no collisions can occur independently of time. For this purpose, the first manipulator is prioritized and a motion path $u=[u_0, u_1, \ldots, u_n]$ is determined based on the first dynamic roadmap, whereby the second manipulator is ignored. The working space $W_{M1}(u)$, which is occupied by the first manipulator when moving along the path u, can be represented as follows:

$$W_{M1}(u) = \bigcup_{i=0}^{n} \phi_{v,M1}^{-1}(u_i) \cup \bigcup_{i=0}^{n-1} \phi_{e,M1}^{-1}(u_i, u_{i+1})$$

Apart from the mappings of a start and an end point and their connection to the graph of the dynamic roadmap, all other mappings are pre-calculated and thus directly available. After the configurations for the start and end point as well as their connections to the roadmap have been determined, a motion path for the second manipulator can be determined, whereby only the remaining configuration space $W_{M2}=W/W_{M1}(u)$ is considered.

Figure 3:
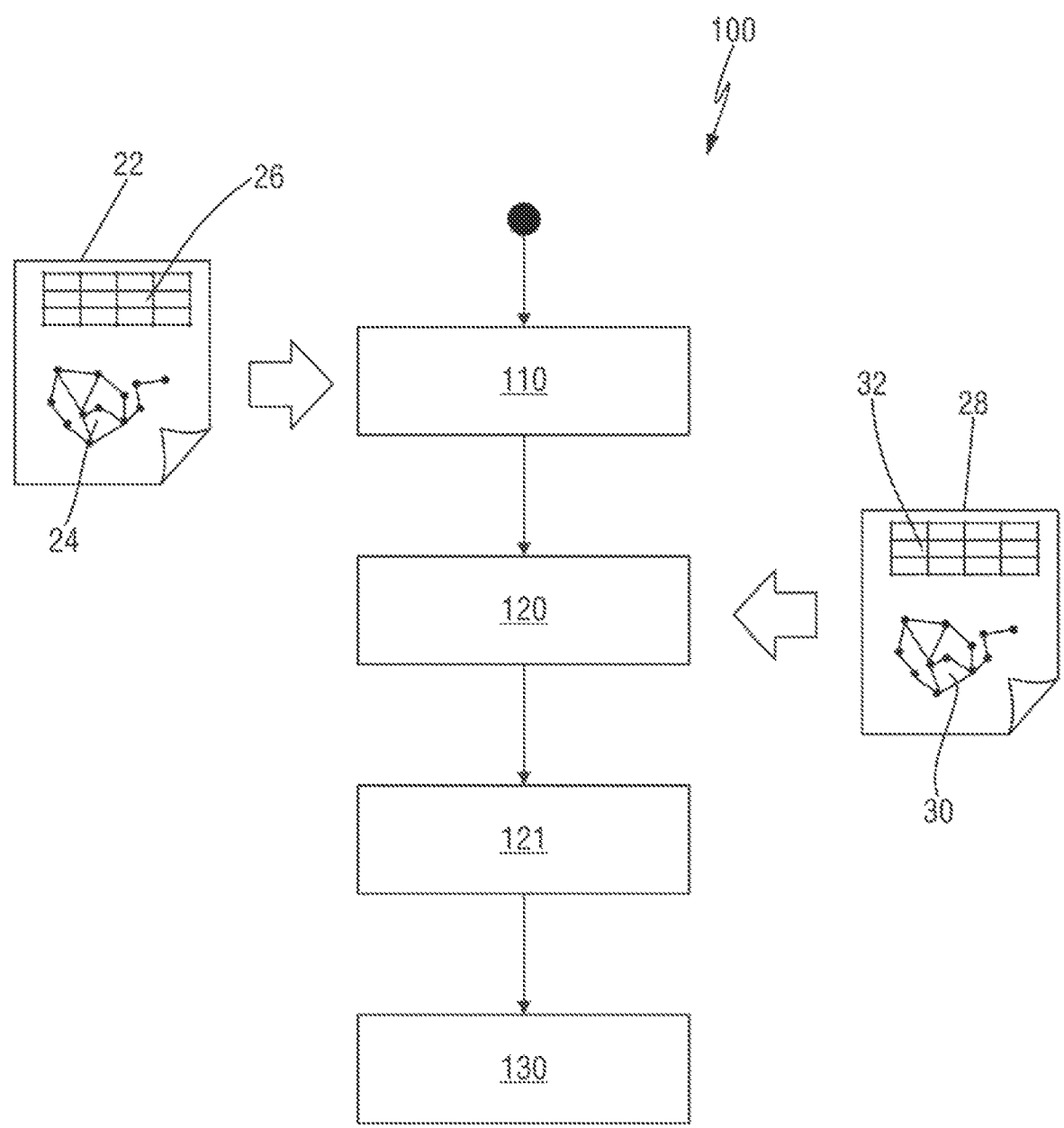
FIG. 3 shows a block diagram of another exemplary embodiment of a method for collision-free motion planning.
Figure 4:
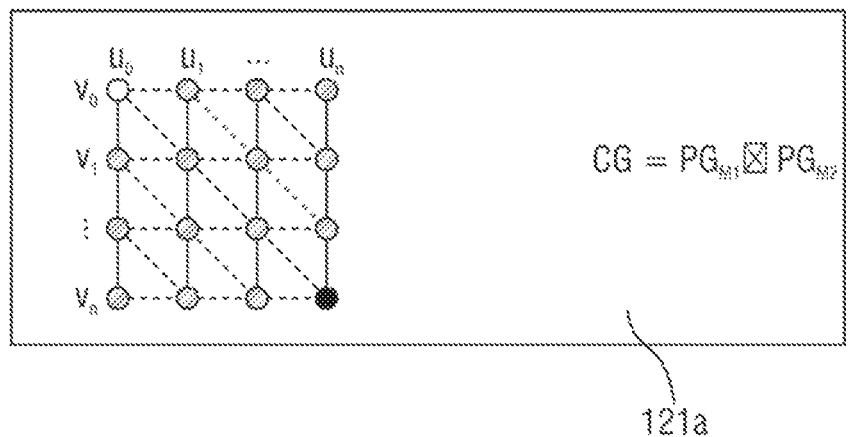
FIG. 4 shows embodiments of various coordination graphs.
Figure 4:
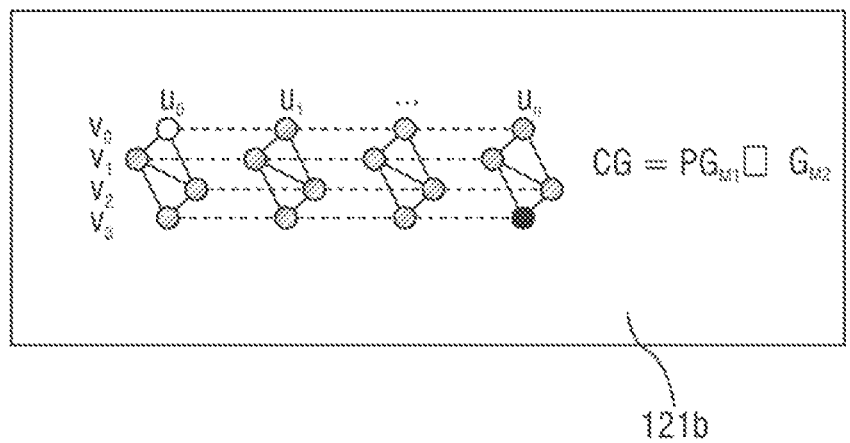
Figure 4:
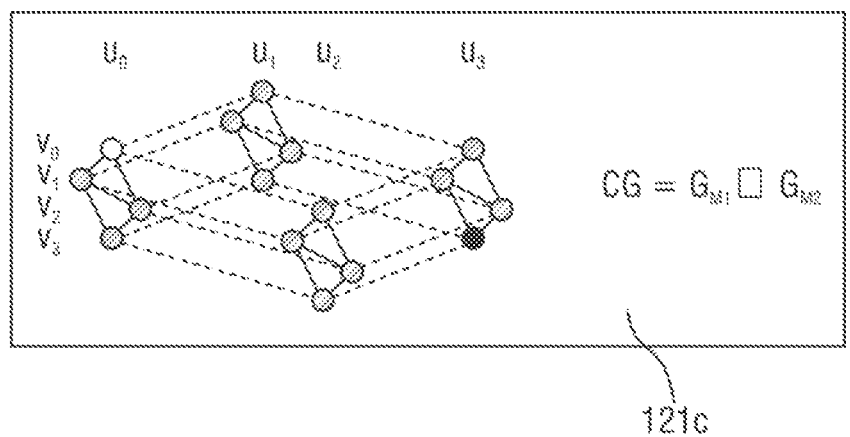

Referring to FIGS. 3 and 4, the further three approaches for coordinating the motion of the first manipulator and the second manipulator, all of which comprise a further method step, are explained in more detail below.

FIG. 3 shows the method from FIG. 2 with an additional method step 121 between steps 120 and 130. Apart from this, the method according to FIG. 3 is identical to the method according to FIG. 2.

The further method step 121 comprises generating a coordination graph based on the first dynamic roadmap and the second dynamic roadmap, based on which motion planning of the first manipulator and the second manipulator is performed. The approaches differ from each other in the generation of this coordination graph.

The second approach, hereinafter also referred to as path coordination, is a less restrictive approach compared to the strict separation of the working spaces applied in fixed separation coordination. The second approach creates two independent motion paths for the first and second manipulators and then coordinates the motion along these paths so that no collision occurs.

Using dynamic roadmaps as a basis for path planning makes it possible for coordination to test whether common intersections of the motion paths are given. This is done on the basis of the mappings $\phi$ or $\phi^{-1}$. A costly collision check can thus be avoided.

The result of the independent planning is a first motion path $u=[u_0, u_1, \ldots, u_n]$ for the first manipulator and a second motion path $v=[v_0, v_1, \ldots, v_m]$ for the second manipulator. Both paths can be interpreted as linear graphs $PG_{M1}$ and $PG_{M2}$. The coordination graph $CG_{PC}$ is then the full graph product $CG_{PC}=PG_{M1} \boxtimes PG_{M2}$. Such a coordination graph $CG_{PC}$ for path coordination is indicated graphically in FIG. 4 with reference numeral 121a.

Each node in $CG_{PC}$ is a pair $(u_i, v_j)$ with $i=0, \ldots, n$ and $j=0, \ldots, m$. Edges to $(u_{i+1}, v_j)$, $(u_i, v_{j+1})$ and $(u_{i+1}, v_{j+1})$ correspond to motions of either one manipulator alone or a parallel motion of both manipulators.

A node $(u_i, v_j)$ of the coordination graph $CG_{PC}$ is valid when $$\phi_{v,M1}^{-1}(u_i) \cap \phi_{v,M2}^{-1}(v_j) = \emptyset$$

is satisfied.

A parallel motion of both manipulators is valid when $$(\phi_{v,M1}^{-1}(u_i) \cup \phi_{e,M1}^{-1}(u_i, u_{i+1}) \cup \phi_{v,M1}^{-1}(u_{i+1})) \cap (\phi_{v,M2}^{-1}(v_j) \cup \phi_{e,M2}^{-1}(v_j, v_{j+1}) \cup \phi_{v,M2}^{-1}(v_{i+1})) = \emptyset$$

is satisfied.

For the motion of a single arm it is sufficient to test for the following conditions:

$$\phi_{e,M1}^{-1}(u_i, u_{i+1}) \cap \phi_{v,M2}^{-1}(v_j) = \emptyset$$

or $$\phi_{v,M1}^{-1}(u_i) \cap \phi_{e,M2}^{-1}(v_j, v_{j+1}) = \emptyset$$

As soon as the coordination graph has been generated, coordination can take place by searching for the shortest valid path in the coordination graph. In a preferred embodiment, parallel motion of the arms can be preferred over successive motion of individual arms by weighting the latter negatively in the graph search.

In path coordination, no time parameterization is performed for the respective paths, nor is path coordination dependent on such a time parameterization. A time parameterization, which takes into account the permissible velocities and accelerations, can then be performed on the coordinated path. If a motion path of the first or second manipulator has fewer nodes than the motion path of the respective other manipulator, then one manipulator must in any case wait at a time while the other manipulator is in motion.

The third approach, also referred to as dynamic separation, is explained in more detail below.

In dynamic separation coordination, a coordination graph based on the first dynamic roadmap and the second dynamic roadmap is generated first. As with fixed separation, the first manipulator is prioritized and a valid motion path $u=[u_0, u_1, \ldots, u_n]$ is determined based on the first dynamic roadmap, whereby the second manipulator is ignored.

In contrast to fixed separation coordination, however, not the entire working space $W_{M1}(u)$ is blocked during motion planning for the second manipulator. Rather, the motion of the first manipulator is coordinated along its motion path u, while the motion of the second manipulator is coordinated along the search graph of the second dynamic roadmap.

In contrast to path coordination, the coordination graph for dynamic separation coordination is formed from the Cartesian product of the linear graph of path u with the second search graph $CG_{GS}=PG_{M1} \square G_{M2}$. An illustration of such a coordination graph is depicted in FIG. 4 with reference numeral 121b. Using the Cartesian product produces a graph with fewer nodes and edges than using a Tensor product or a full graph product and is therefore less complex.

This can be compensated by performing a path coordination subsequent to the dynamic separation coordination.

Each node of the coordination graph $CG_{GS}$ corresponds to a pair of points $(u_i,v)$, where $u_i$ is an element of the graph $PG_{M1}$ and v is a node of the search graph $G_{M2}$ of the second dynamic roadmap.

A node is valid when $\phi_{v,M1}^{-1}(u_i) \cap \phi_{v,M2}^{-1}(v) = \emptyset$ is satisfied.

An edge from $(u_i,v)$ to $(u_{i+1}, v)$ is valid when $\phi_{e,M1}^{-1}(u_i, u_{i+1}) \cap \phi_{v,M2}^{-1}(v) = \emptyset$ is satisfied.

An edge from $(u_i, v')$ is valid when $\phi_{v,M1}^{-1}(u_i) \cap \phi_{e,M2}^{-1}(v, v') = \emptyset$ is satisfied.

The motion coordination of the first manipulator and the second manipulator takes place as before with the path coordination on the basis of the coordination graph by determining the shortest permissible path in a manner known per se. As with path coordination, the majority of the mappings are already pre-calculated and stored in tabular form.

The fourth approach to coordination is called graph coordination. Here, both manipulators are coordinated along their respective search graphs $G_{M1}$ and $G_{M2}$ and possible overlaps are determined. Similar to dynamic separation, in graph coordination the coordination graph is formed from a Cartesian product.

The coordination graph for graph coordination is the Cartesian product of the first search graph and the second search graph $CG_{GC} = G_{M1} \Box G_{M2}$ (FIG. 4, 121c). As before, coordination is then carried out using the coordination graph by searching for the shortest valid path in the coordination graph.

With graph coordination the complexity of the coordination graph $CG_{GC}$ may become very high with larger dynamic roadmaps and thus make a graph search prohibitively expensive. Therefore, in other embodiments, suboptimal search algorithms can be used for compensation.

The above approaches can be further optimized by replacing at least one of the dynamic roadmaps with a dynamic roadmap having additional time information. This would have the advantage that time aspects can, at least partially, be taken into account during the planning phase. Depending on the scenario, the path search can be further improved and, if necessary, accelerated.

While the above-mentioned approaches have each been listed as alternatives, the individual approaches can also be combined in other embodiments. For example, a path coordination can be performed subsequent to a dynamic separation coordination. Thereby, it is not necessary to follow-up with a different coordination approach each time. In other embodiments, the individual approaches can also be linked dynamically. For example, it is conceivable that in one scenario a first approach is carried out and in another scenario another approach is carried out. Thus, the approaches can be linked arbitrarily, whereby the respective selection can depend on external factors.

It also goes without saying that the coordination procedures described in relation to two manipulators can also be easily extended to multi-arm systems.

What is claimed is:

1. A method for collision-free motion planning of a first manipulator in a first working space and a second manipulator in a second working space, the first working space and the second working space at least partially overlapping, the method comprising:
    importing a first dynamic roadmap for a first configuration space of the first manipulator, wherein the first dynamic roadmap includes a first search graph and a first mapping between the first working space and the first search graph;
    importing a second dynamic roadmap for a second configuration space of the second manipulator, wherein the second dynamic roadmap includes a second search graph and a second mapping between the second working space and the second search graph;
    determining a first motion path for the first manipulator based on the first dynamic roadmap;
    determining a second motion path for the second manipulator based on the second dynamic roadmap;
    linking, to a coordination graph, at least one of (i) the first motion path and the second motion path, (ii) the first motion path and the second search graph, and (iii) the first search graph and the second search graph; and
    coordinating the motion of the first manipulator and the second manipulator based on the first dynamic roadmap and the second dynamic roadmap using the coordination graph.

2. The method of claim 1, wherein coordinating the motion includes checking for collisions between the first manipulator and the second manipulator by using the first mapping and the second mapping.

3. The method of claim 1, wherein the first motion path is determined independently of the second motion path.

4. The method of claim 1, wherein:
    the first motion path defines an occupied area in the first working space, and
    the second motion path is determined outside the occupied area.

5. The method of claim 1, wherein:
    for determining the first motion path for the first manipulator, a collision with the second manipulator is ignored, and
    for determining the second motion path for the second manipulator, a collision with the first manipulator is ignored.

6. The method of claim 1, wherein:
    the first motion path for the first manipulator is a first linear graph,
    the second motion path for the second manipulator is a second linear graph, and
    the coordination graph includes the full graph product of the first linear graph and the second linear graph.

7. The method of claim 1, wherein:
    the first motion path for the first manipulator is a first linear graph, and
    the coordination graph is the Cartesian product of the first linear graph and the second search graph.

8. The method of claim 1, wherein the coordination graph is the Cartesian product of the first search graph and the second search graph.

9. A method for collision-free motion planning of a first manipulator in a first working space and a second manipulator in a second working space, the first working space and the second working space at least partially overlapping, the method comprising:
    importing a first dynamic roadmap for a first configuration space of the first manipulator, wherein the first dynamic roadmap includes a first search graph and a first mapping between the first working space and the first search graph;
    importing a second dynamic roadmap for a second configuration space of the second manipulator, wherein the second dynamic roadmap includes a second search graph and a second mapping between the second working space and the second search graph; and coordinating the motion of the first manipulator and the second manipulator based on the first dynamic roadmap and the second dynamic roadmap, wherein at least one of the first dynamic roadmap and the second dynamic roadmap is an extended dynamic roadmap including an extended search graph with nodes comprising additional time information, and wherein coordinating the motion of the first manipulator and the second manipulator is further based on the extended dynamic roadmap.

10. The method of claim 9, wherein coordinating the motion includes checking for collisions between the first manipulator and the second manipulator by using the first mapping and the second mapping.

11. An apparatus comprising:
a first manipulator in a first working space;
a second manipulator in a second working space, wherein the first working space and the second working space at least partially overlap; and
a control unit for dynamic motion planning, wherein the control unit is configured to perform:
importing a first dynamic roadmap for a first configuration space of the first manipulator, wherein the first dynamic roadmap includes a first search graph and a first mapping between the first working space and the first search graph;
importing a second dynamic roadmap for a second configuration space of the second manipulator, wherein the second dynamic roadmap includes a second search graph and a second mapping between the second working space and the second search graph;
determining a first motion path for the first manipulator based on the first dynamic roadmap;
determining a second motion path for the second manipulator based on the second dynamic roadmap;
linking, to a coordination graph, at least one of (i) the first motion path and the second motion path, (ii) the first motion path and the second search graph, and (iii) the first search graph and the second search graph; and
coordinating the motion of the first manipulator and the second manipulator based on the first dynamic roadmap and the second dynamic roadmap using the coordination graph.

12. The apparatus of claim 11, wherein coordinating the motion includes checking for collisions between the first manipulator and the second manipulator by using the first mapping and the second mapping.

13. The apparatus of claim 11, wherein the first motion path is determined independently of the second motion path.

14. The apparatus of claim 11, wherein:
the first motion path defines an occupied area in the first working space, and
the second motion path is determined outside the occupied area.

15. The apparatus of claim 11, wherein:
for determining the first motion path for the first manipulator, a collision with the second manipulator is ignored, and
for determining the second motion path for the second manipulator, a collision with the first manipulator is ignored.

16. The apparatus of claim 11, wherein:
the first motion path for the first manipulator is a first linear graph,
the second motion path for the second manipulator is a second linear graph, and
the coordination graph includes the full graph product of the first linear graph and the second linear graph.

17. The apparatus of claim 11, wherein:
the first motion path for the first manipulator is a first linear graph, and
the coordination graph is the Cartesian product of the first linear graph and the second search graph.

18. The apparatus of claim 11, wherein the coordination graph is the Cartesian product of the first search graph and the second search graph.

* * * * *